United States Patent [19]

Simonson et al.

[11] Patent Number: 4,712,157
[45] Date of Patent: Dec. 8, 1987

[54] STUD MOUNTED NON-METALLIC ELECTRIC ENCLOSURE

[75] Inventors: Dale E. Simonson; Donald H. Stoll, both of Mankato, Minn.

[73] Assignee: General Electric Company, New York, N.Y.

[21] Appl. No.: 26,321

[22] Filed: Mar. 16, 1987

[51] Int. Cl.$^4$ ............................ H02B 1/04; H05K 7/20
[52] U.S. Cl. .................................... 361/357; 220/3.3; 174/58; 361/379; 361/386
[58] Field of Search ........................ 220/3.2, 3.3, 3.6; 174/58; 361/334, 353, 355, 356, 357, 358, 360, 361, 363, 369, 376, 379, 383, 386, 390, 391, 417, 419, 420

[56] References Cited

U.S. PATENT DOCUMENTS

| 2,182,603 | 12/1939 | Walker | 361/369 |
| 3,187,084 | 6/1965 | Stillman | 174/58 |
| 3,646,401 | 2/1972 | Freegard | 361/379 |
| 3,681,663 | 8/1972 | Albers | 361/379 |
| 3,801,875 | 4/1974 | Morby et al. | 317/120 |
| 4,266,683 | 5/1981 | Sellinger | 220/3.2 |
| 4,646,200 | 2/1987 | M'Sadogues | 361/363 |

OTHER PUBLICATIONS

David A. Hibbert et al., "Molded Plastic Enclosure for Disconnect Switches", Ser. No. 811,716, filed Dec. 20, 1985.
David A. Hibbert et al., "Molded Plastic Enclosure for Electric Switch Apparatus", Ser. No. 874,755, filed Jun. 16, 1986.

Primary Examiner—G. P. Tolin
Attorney, Agent, or Firm—Richard A. Menelly; Walter C. Bernkopf; Fred Jacob

[57] ABSTRACT

A molded plastic load center enclosure allows the circuit breakers contained therein to be compactly aligned on one side of the enclosure. Depressions formed within the bottom of the interior surface of the enclosure produce bosses extending from the exterior surface thereof, which provide a cooling air circulatory space between the enclosure and a support wall. Metal disks inserted within the depressions provide increased thermal capacity to the enclosure interior while allowing the use of explosive charge-driven nails to attach the enclosure to the support wall without damaging the plastic material.

9 Claims, 5 Drawing Figures

STUD MOUNTED NON-METALLIC ELECTRIC ENCLOSURE

BACKGROUND OF THE INVENTION

U.S Pat. No. 3,801,875, entitled "Non-Metallic Load Center With Improved Bus Bar Construction", describes a molded plastic load center wherein the plastic case includes circuit breaker and branch strap mounting means integrally formed therein. The insulative properties of the plastic allows the circuit breakers to be compactly arranged without fear of electrical breakdown between the breakers or the terminal connections. The circuit breaker branch straps are mounted on the bottom surface of the plastic enclosure. Access to the terminal connections is made by unscrewing the cover from the case and lifting the cover away from upstanding tabs integrally formed within the case.

U.S. Patent application Ser. No. 874,755, filed June 16, 1986, entitled "Molded Plastic Enclosure For Electric Service Apparatus", describes one such enclosure including an access door mounted on the cover for convenient access to the circuit breakers contained therein. A locking hasp is integrally formed on the door for padlocking the door against unauthorized access.

U.S. Patent application Ser. No. 811,716, filed Dec. 20, 1985, entitled "Molded Plastic Enclosure For Disconnect Switches", wherein an access door is formed within the cover and hasp means are integrally formed within the cover for the arrangement of a padlock to prevent unauthorized access. The switches contained within the enclosure are of the type used with air conditioning disconnects. Both aforementioned patent applications are incorporated for reference purposes and should be reviewed for a good description of the relationship between the molded plastic door, cover and case used for housing both circuit breakers and electric switches.

Although non-metallic load centers have found limited application over the past few years, wide market acceptance has not, as yet, been realized mainly due to the lower cost of comparable metallic load centers as well as the ease afforded in mounting the metallic load centers to support walls. An explosive charge-driven tool or "stud gun" has not heretofore been used with plastic load centers because of the fracturing of the plastic caused by the radial tensile forces on the plastic material at the sides of the driven nail as well as the compressive forces applied to the plastic material under the drive nail head.

U.S. Patent application Ser. No. 026,503, filed 3/16/87 entitled "Compact Non-metallic Electrical Load Center Enclosure", describes the use of a shaped metal cap inserted within openings formed through the bottom of a plastic load center enclosure to allow the use of an explosive charge-driven tool to flush-mount the enclosure to a support wall. This application is incorporated herein for purposes of reference and should be reviewed for its teachings of the plastic resin materials used to form injection molded plastic enclosures. In some applications, the enclosure must remain water tight such that such openings are not permitted. In other applications, some cooling space is required between the enclosure and the support wall, such that flush-mounting is not allowed.

One purpose of the instant invention is to describe a molded plastic enclosure for electrical equipment such as switches, meters and breakers wherein the three plastic enclosure components are formed on automated equipment and wherein the metallic components are inserted by means of a completely automated process. It has since been determined that the savings realized by complete automation results in a molded plastic circuit breaker enclosure that is less expensive than comparable metallic circuit breaker enclosures. Another purpose of the instant invention is to describe a means for attachment of non-metallic electrical enclosures which also provides increased thermal capacity to the interior of the enclosure.

SUMMARY OF THE INVENTION

A molded plastic enclosure for electrical equipment wherein the three plastic components are formed by means of a high speed injection molding process and wherein the non-metallic components are capable of robotic assembly in a completely automated process. The enclosure includes a plurality of stud mounting disks inserted within recesses formed in the back of the enclosure to facilitate the use of a stud gun to attach the load center to a support wall while providing increased thermal capacity to the interior of the enclosure.

DESCRIPTION OF THE PREFERRED EMBODIMENT

Figure 1:
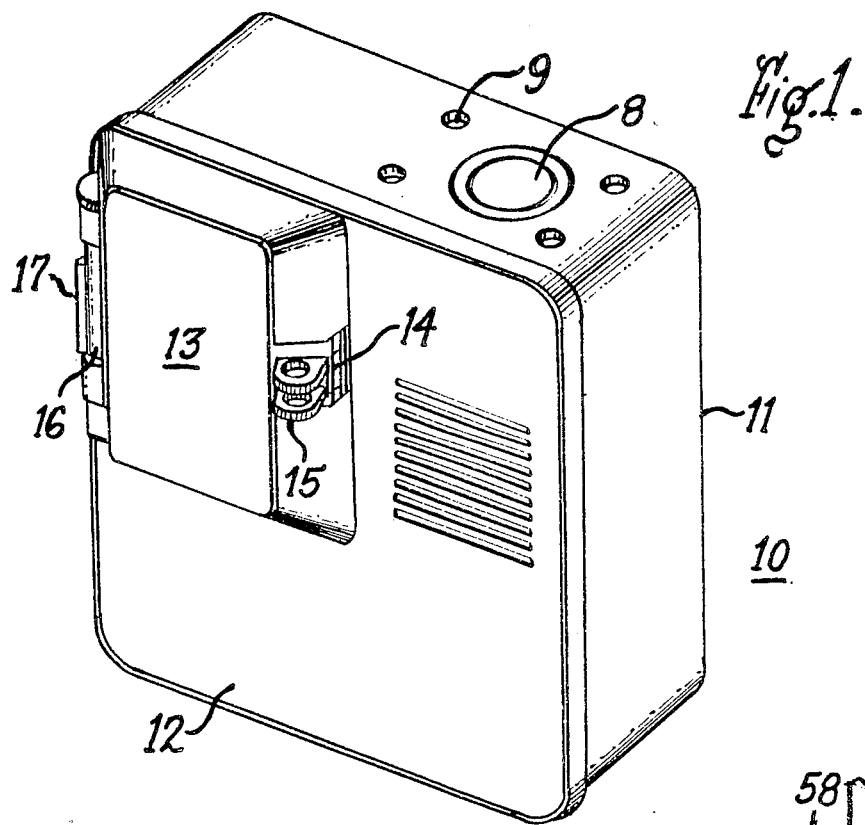
FIG. 1 is a front perspective view of a non-metallic load center according to the invention.

As illustrative of one type electrical enclosure within the scope of the invention, a molded plastic load center 10 is shown in FIG. 1, wherein a plastic case 11 is attached to a plastic cover 12 to which a plastic door 13 is mounted by means of a hinge assembly consisting of a hinge pin 16 and curvilinear projections 17. A locking hasp 14 is integrally formed on the door to cooperate with padlock projections 15 and the door face can be made from a transparent plastic material for viewing the ON-OFF condition of the circuit breakers contained therein. Four screw holes 9 are formed through the top of the case to facilitate connection to an electric cable conduit through the electrical access hole 8 formed therein.

Figure 5:
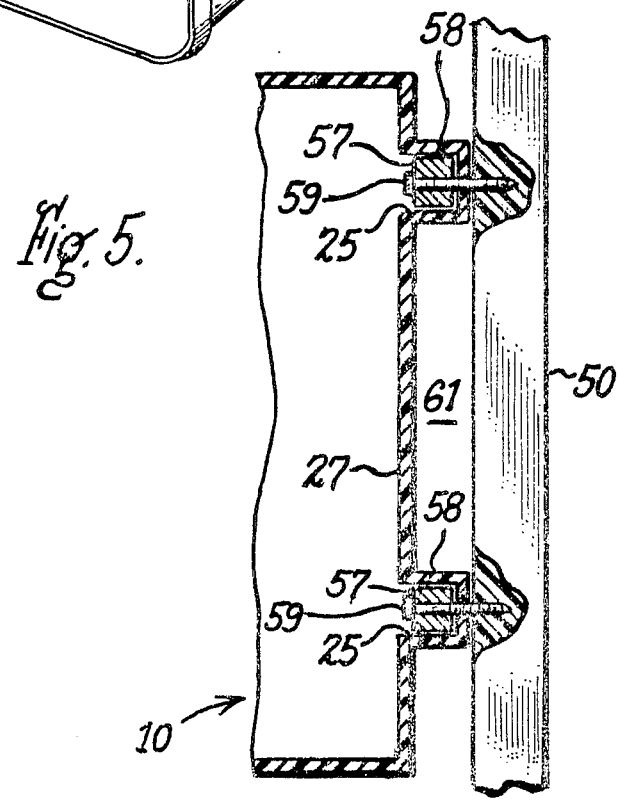
FIG. 5 is a side view, in partial section, of the load center of FIG. 1 attached to a support wall. de
Figure 2:
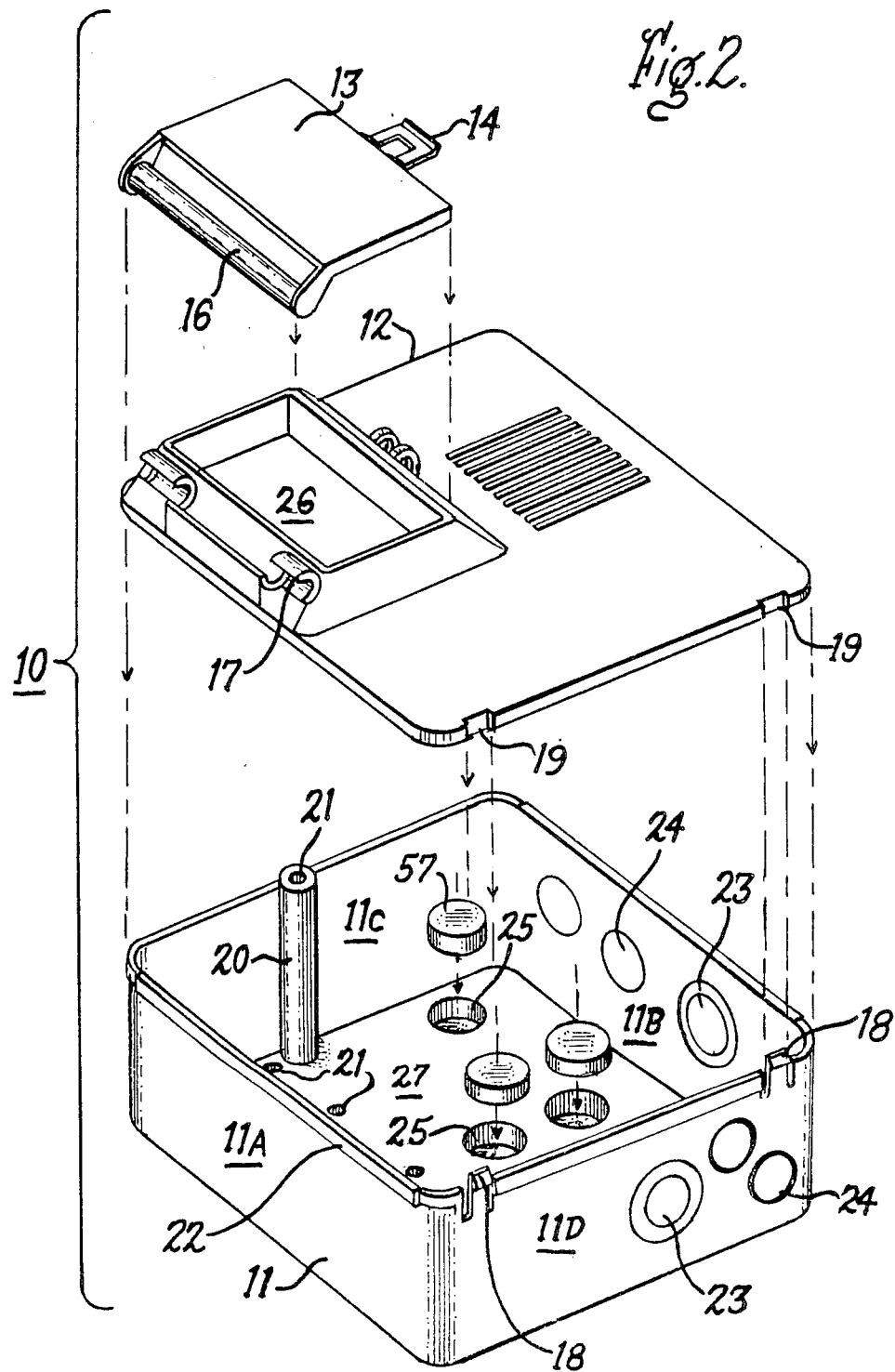
FIG. 2 is a top perspective view, in isometric projection, of the door, cover and case of the load center depicted in FIG. 1.

As shown in FIG. 2, the load center housing 10 is formed from three separate injection molded plastic parts such as the case 11, cover 12 and door 13 described earlier. The case comprises a pair of opposing side walls 11A, 11B joined by top and bottom end walls 11C, 11D and a bottom 27. A plurality of larger knockouts 23 are integrally formed within the side walls and the top and bottom of the case for passage of electrical cable while a corresponding plurality of smaller knockouts 24 are formed therein for passage of electric wires. A mounting post 20 and an internally threaded screw hole 21 are integrally formed within the case for receiving a screw to attach the cover 12 after insertion of the integrally formed tabs 18 in the case within the slots 19 formed in the bottom edge of the cover. Recesses 25 are formed within the bottom 27 to allow for the insertion of metal mounting slugs or disks 57. The disks can be press-fitted within the recesses or attached to the bottom of the recess by a suitable cement. The mass of the metal disks increases the heat capacity of the interior of the enclosure, while the bosses 58, formed on the exterior surface of the bottom 27 opposite the recesses, provide a cooling space 61 between the bottom of the enclosure and a separate support wall 50, as shown in FIG. 5. Referring to FIG. 2, the door 13 is next attached by snappingly inserting the hinge pin 16 within complementary curvilinear projections 17 integrally formed in the cover.

Figure 3:
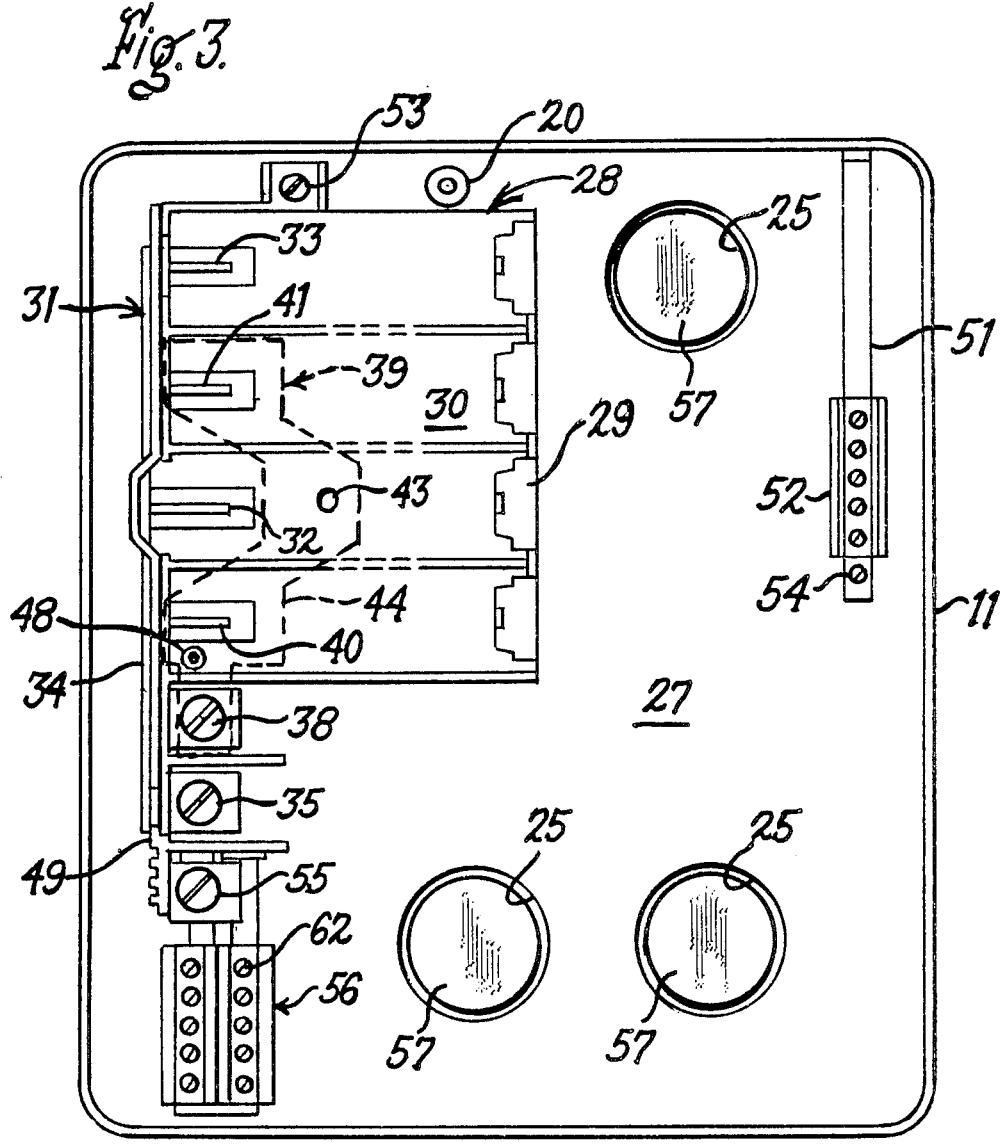
FIG. 3 is a top perspective view, in isometric projection, of the components used within the load center shown in FIG. 1.

Prior to attachment of the door and cover to the case, the electrical components are inserted within the case, as depicted now in FIG. 3. The ground terminal connectors 52 are attached to the bottom 27 of the case by means of a machine screw 54 passing through the underlying ground strap 51. A circuit breaker support assembly consisting of insulative support 28, branch strap side assembly 31 and branch strap bottom assembly 39 is then attached within the case by means of a separate machine screw 53. The branch strap bottom assembly 39 is first attached to the plastic insulating platform 30 and a terminal lug 38 is arranged over one end. The branch strap side assembly 31 is positioned adjacent the plastic insulating platform 30 in such a manner that the circuit breaker stabs 40, 41 on the branch strap bottom assembly are interposed with the circuit breaker stabs 32, 33 on the branch strap side assembly and a second terminal lug 35 is positioned as indicated. The neutral terminal assembly 56 containing the neutral terminal screws 62 and the terminal lug 55 is then attached next to the terminal lugs 38, 35 to complete the assembly. The circular recesses 25, containing the metal disks 57, are shown arranged within the parts of the case bottom 27 not occupied by the circuit breaker mounting assembly 29, as indicated in FIG. 3.

Figure 4:
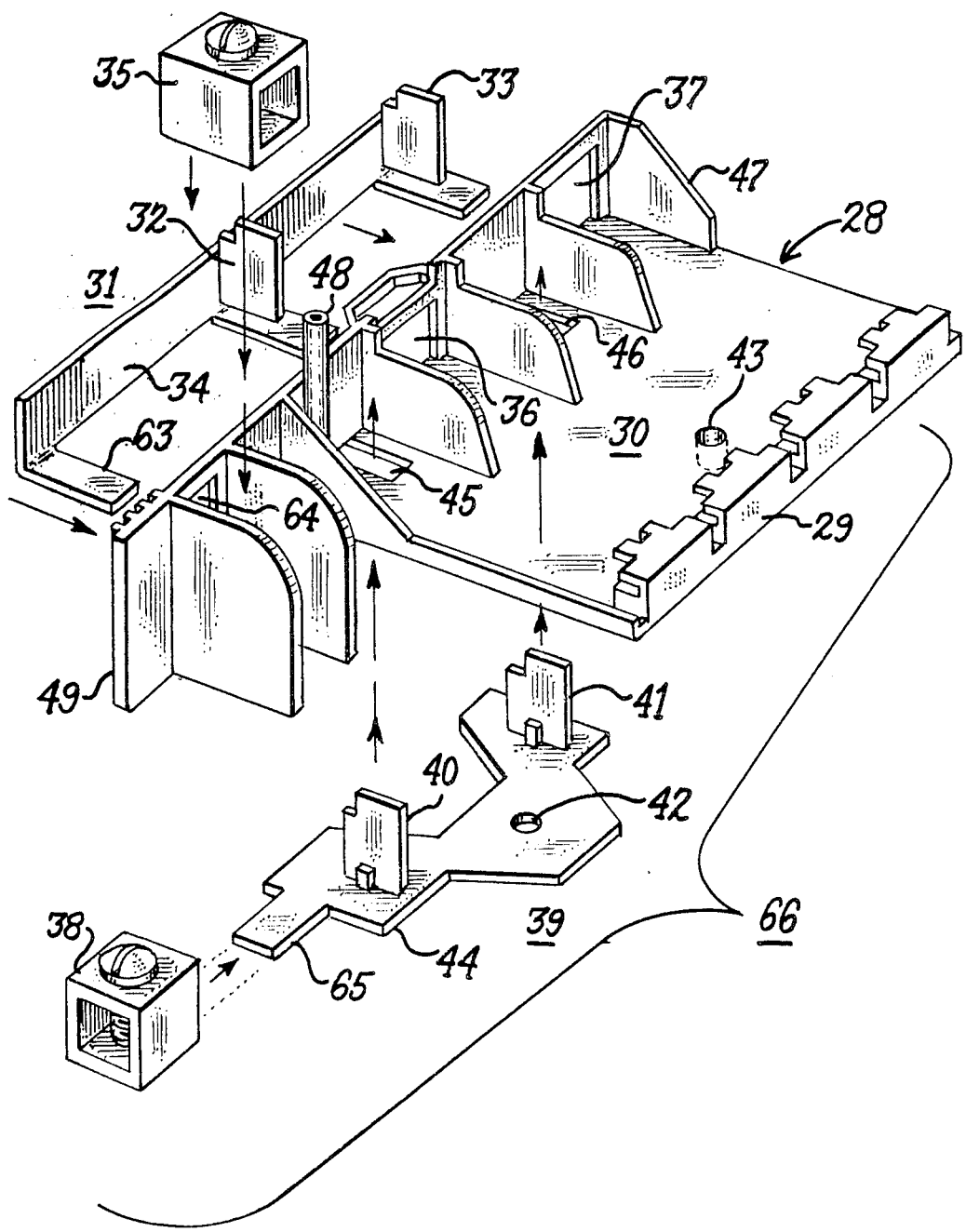
FIG. 4 is a plan view of the load center of FIG. 1 with the door and cover removed.

As shown in FIG. 4, the branch strap bottom is inserted within terminal lug 38 which supports the upstanding circuit breaker stab connectors 40, 41 brazed or welded thereon. A locating hole 42 is formed through the branch strap bottom assembly for capture by a pin 43 projecting from the bottom of the plastic insulating support platform 30. The branch strap side assembly 31 comprises a shaped branch strap 34 having circuit breaker stab connectors 32, 33 welded or brazed to one side. The plastic insulating circuit breaker support 28 is formed from a single molding process into the bottom support platform 30, vertically extending back support wall 49 and parallel baffles 47. The terminal end 63 on the branch strap back assembly 31 extends through a slot 64 formed through the back support wall and the circuit breaker stabs 32, 33 extend through the slots 36, 37. Once the branch strap back assembly is positioned against the back support wall 49, the terminal lug 35 is then arranged over the terminal end 63 which also helps to retain the branch strap back assembly against the back support wall. The branch strap bottom assembly 39 is arranged underneath the bottom support platform 30 by capturing pin 43 within the locating hole 42 and passing the stabs 40, 41 through the complementary slots 45, 46 formed through the bottom support platform. A support and guide post 48 is integrally formed within the top of the back support. The branch circuit breakers (not shown) are mounted on the support by means of integrally formed circuit breaker mounting hooks 29.

In FIG. 5, the bottom 27 of the circuit breaker enclosure 10 is shown without the circuit breaker mounting assembly attached therein to depict the formature of the air cooling space 61 set between the bottom 27 of the case by the bosses 58 formed on the exterior surface thereof where the circular recesses 25 are impressed during the plastic molding process. The metal disks 57, fabricated from an aluminum or steel composition having a specific heat greater than the plastic case material, increase the thermal capacity of the interior of the enclosure and act as a "heat sink" for the heat generating electrical components contained therein. The nails 59, which penetrate through both the metal disks 57 and the bottom 27 of the plastic case, fixedly hold the enclosure 10 against the support wall 50. The reason that the penetration of the plastic by the nail and the tension exerted upon the plastic material under the disk does not rupture or strain the plastic is not clearly understood at this time. It is believed, however, that the mass of the metal disk acts as a "shock absorber" for the explosive charge-driven nail to dissipate some of the forces generated during the process.

The properties of the plastic materials used to form both the back support 49 as well as the circuit breaker insulating support platform 30, best seen in FIG. 4, are selected in order to meet local and national standards including heat resistance, flame retardance, mechanical impact resistance and electrical resistance as well as chemical resistance. Materials which test favorably include a modified polyphenylene oxide resin, modified polybutylene terepthalate resin and modified polyethylene terepthalate resin.

A compact molded plastic circuit breaker enclosure has thus been described wherein the enclosure is formed from three separate injection molding pieces and wherein the circuit breaker branch strap assembly is inserted therein by means of a downloaded automatic assembly process. The automatic assembly features of the load center make the load center economically competitive with existing state-of-the-art metallic load center enclosures. Means are also described for multifunctionally providing support facility to the enclosure while improving the thermal capacity of the enclosure.

Having thus described our invention, what we claim as new and desire to secure by Letters Patent is:

1. A molded plastic enclosure comprising:
    a plastic case having electrical access means formed therein;
    a molded plastic cover having means for removable attachment to said case;
    electric circuit control means attached to a bottom interior of said case;
    recess means formed within said bottom on an interior surface thereof and extending outward from an exterior surface of said bottom; and
    metal mounting means inserted within said recess means, a fastening member passing through said metal mounting means into support.

2. The molded plastic enclosure of claim 1 wherein said electric circuit control means comprises at least one circuit breaker or at least one electric switch.

3. The molded plastic enclosure of claim 1 wherein said attachment means comprises a pair of slots formed through one edge of said cover.

4. The molded plastic enclosure of claim 3 including a pair of tabs extending from one edge of said case, said tabs extending from said case being captured within said slots through said cover.

5. The molded plastic enclosure of claim 1 wherein said metal mounting means comprise a metal disk.

6. The molded plastic enclosure of claim 5 wherein said metal disk is press-fitted within said recess means.

7. The molded plastic enclosure of claim 1 wherein said case comprises a plastic resin selected from the group consisting of polyphenylene oxide, polybutylene terepthalate and polyethylene terepthalate.

8. The molded plastic enclosure of claim 1 wherein said metal disk is selected from the group consisting of aluminum and steel.

9. The molded plastic enclosure of claim 5 wherein said metal disk is adhesively attached within said recess.

* * * * *